(12) United States Patent
Chen

(10) Patent No.: US 9,561,394 B2
(45) Date of Patent: Feb. 7, 2017

(54) FITNESS EQUIPMENT SPRING COUNTERWEIGHTS BALANCER

(71) Applicant: Jiajia Chen, Xiamen (CN)

(72) Inventor: Jiajia Chen, Xiamen (CN)

( * ) Notice: Subject to any disclaimer, the term of this patent is extended or adjusted under 35 U.S.C. 154(b) by 0 days.

(21) Appl. No.: 15/109,647

(22) PCT Filed: Dec. 30, 2014

(86) PCT No.: PCT/CN2014/095616
§ 371 (c)(1),
(2) Date: Jul. 4, 2016

(87) PCT Pub. No.: WO2015/109926
PCT Pub. Date: Jul. 30, 2015

(65) Prior Publication Data
US 2016/0332020 A1     Nov. 17, 2016

(30) Foreign Application Priority Data

Jan. 24, 2014   (CN) ..................... 2014 2 0044865 U

(51) Int. Cl.
*A63B 21/05*   (2006.01)
*A63B 21/00*   (2006.01)
(Continued)

(52) U.S. Cl.
CPC ..... *A63B 21/00069* (2013.01); *A63B 21/0428* (2013.01); *A63B 21/153* (2013.01);
(Continued)

(58) Field of Classification Search
CPC ............ A63B 21/00069; A63B 21/008; A63B 21/0083; A63B 21/0085; A63B 21/0087; A63B 21/022; A63B 21/023; A63B 21/025; A63B 21/04; A63B 21/0407; A63B 21/0428; A63B 21/05;A63B 21/15; A63B 21/151; A63B 21/152; A63B 21/153; A63B 21/154; A63B 21/155; A63B 21/227; A63B 21/4049; A63B 2071/0063; A63B 2071/0072; A63B 2220/50; A63B 2220/51; F16H 19/005; F16H 19/006; F16H 19/06; F16H 19/0604; F16H 19/0618; F16H 19/0622; F16H 19/0631; F16H 19/0645; F16H 19/0654; F16H 19/0659; F16H 19/0672; F16H 2019/0609; F16H 2019/0627; F16H 2019/0677; F16H 2019/0686; F16H 2019/085; F16F 1/06; F16F 3/04
See application file for complete search history.

(56) References Cited

U.S. PATENT DOCUMENTS 4,480,832 A * 11/1984 Bulmash ............ A63B 21/0004
                                            188/321.11
4,685,670 A *  8/1987 Zinkin ................ A63B 21/04
                                            482/129

(Continued)

FOREIGN PATENT DOCUMENTS

CN   101507871 A    8/2009
CN   201643528 U   11/2010
(Continued)

*Primary Examiner* — Joshua Lee
(74) *Attorney, Agent, or Firm* — Gokalp Bayramoglu

(57) ABSTRACT

A fitness equipment spring counterweights balancer, comprising hand wheel, lead screw, upper and lower frame beams, upper and lower pulley blocks, spring guiding pillar, upper and lower spring seats, at least one spring, vortex track, big wheel, steel wire rope connecting the pulley block and the vortex track, steel wire rope which connects both the big wheel and fitness equipment. The springs are arranged between upper and lower spring seats. After the spring guiding pillar passes through the springs and the upper and lower spring seats, the both ends of the spring guiding pillar (Continued)

are connected with the upper and lower frame beams. One end of the steel wire rope connecting the pulley block and the vortex track is mounted on one side of the lower pulley block. One end of the steel wire rope connecting the big wheel and fitness equipment is mounted on the big wheel.

2 Claims, 1 Drawing Sheet

(51) Int. Cl.
A63B 21/02 (2006.01)
F16H 19/06 (2006.01)
F16F 3/04 (2006.01)
A63B 21/04 (2006.01)

(52) U.S. Cl.
CPC ............ *A63B 21/4049* (2015.10); *F16F 3/04* (2013.01); *F16H 19/0659* (2013.01)

(56) References Cited

U.S. PATENT DOCUMENTS

| | | | | |
|---|---|---|---|---|
| 4,794,805 A * | 1/1989 | Carney | ................ | A63B 51/005 73/862.452 |
| 5,005,831 A * | 4/1991 | Hara | ................... | A63B 21/023 482/129 |
| 6,142,919 A * | 11/2000 | Jorgensen | ............ | A63B 21/055 482/121 |
| 6,958,032 B1 * | 10/2005 | Smith | ................... | A63B 21/023 482/121 |
| 7,150,682 B2 * | 12/2006 | Varner | ................. | A63B 21/023 473/219 |
| 7,677,540 B1 * | 3/2010 | Duval | .................... | F16F 1/121 267/170 |
| 7,758,479 B2 * | 7/2010 | Husted | ............. | A63B 21/00072 482/100 |
| 9,050,497 B2 * | 6/2015 | Reyes | .................. | A63B 21/062 |
| 2004/0038785 A1 * | 2/2004 | Plavsic | ............ | A63B 21/00072 482/128 |
| 2004/0185988 A1 * | 9/2004 | Hsiung | ............ | A63B 21/00072 482/102 |
| 2004/0224827 A1 * | 11/2004 | Ashley | ................... | A63B 21/02 482/122 |
| 2006/0100074 A1 * | 5/2006 | Murdoch | ............. | A63B 21/055 482/142 |
| 2007/0010379 A1 * | 1/2007 | Christensen | ......... | A63B 21/015 482/114 |
| 2011/0319202 A1 * | 12/2011 | Heffron | ............. | A63B 69/0086 473/423 |
| 2012/0245003 A1 * | 9/2012 | Mirchev | ......... | A63B 21/00069 482/127 |
| 2013/0116097 A1 * | 5/2013 | Tseng | ................... | A63B 21/023 482/121 |
| 2015/0020620 A1 * | 1/2015 | Garner | ............. | A63B 21/0058 74/37 |

FOREIGN PATENT DOCUMENTS

| | | |
|---|---|---|
| CN | 2030285 U | 7/2013 |
| CN | 103751954 A | 4/2014 |
| CN | 203750099 U | 8/2014 |
| WO | WO2008034211 A1 | 3/2008 |

* cited by examiner

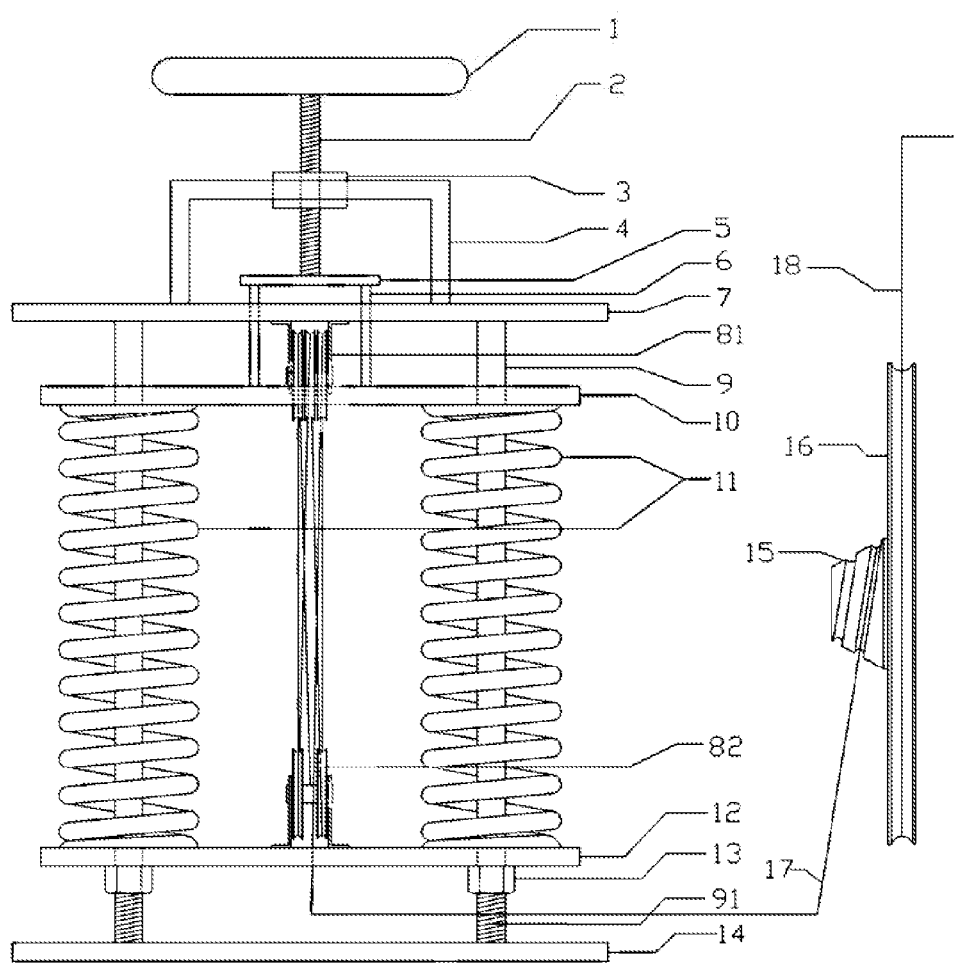

FITNESS EQUIPMENT SPRING COUNTERWEIGHTS BALANCER

TECHNICAL FIELD

The invention is related to a fitness equipment, particularly relating to a fitness equipment counterweights device.

BACKGROUND

Most of existing counterweights devices are using counterweights as the load. Due to the configuration of counterweights being affected by the space, the direction, the cost and many other factors, and thus there are disadvantages of a huge volume, a high cost, and a high transportation cost, which is unfavorable for the widespread popularity. For example, counterweights portion of the traditional fitness equipment is usually made up of multiple counterweights. The design can only be carried out by way of laminating, and the gravity is adjusted by increasing or decreasing the number of the counterweights. Thus, the height and the adjustment precision of the gravity of the fitness equipment are limited, easily leading to a problem, i.e., it is heavier with one more counterweight while it is lighter with one less counterweight. It is not easy for some types of the fitness equipment to switch the different gravities when multiple people are using at the same time.

Chinese patent CN201643528U discloses an automatic counterweighting mechanism for a strength-type fitness equipment, which is controlled by the micro-chips to select the counterweights automatically. It includes two parallel guide shafts, and the counterweights passing though the guide shafts from top to bottom are arranged in sequence to form a counterweights unit. A counterweight lead screw nut is embedded at the center of each counterweight. The top first counterweight of the counterweights unit is equipped with a counterweights automatic selecting mechanism. The counterweights automatic selecting mechanism includes a motor, a gearbox and a lead screw. The lead screw is vertically arranged, and the lead screw is engaged with the counterweight lead screw nut at the center of the counterweights.

SUMMARY OF THE INVENTION

The objective of the invention is to provide a fitness equipment counterweights device, without restrictions of the environment and with easy operation, accurate adjustment, modeling compactness, low cost, and safe use, which is suitable for taking counterweights as the load in any form.

The invention includes a hand wheel, a lead screw, a framework connecting nut, a gravity scale indicating device frame, a plane press plate, a plane press plate guiding pillar, an upper frame beam, an upper pulley block, a lower pulley block, a spring guiding pillar, an upper spring seat, at least one spring, a lower spring seat, a spring guiding pillar connecting mat, a lower frame beam, a vortex track, a big wheel, a steel wire rope connecting the pulley block and the vortex track, a steel wire rope connecting the big wheel and the fitness equipment.

Wherein the hand wheel is fixed at the top of the lead screw; at least one spring is arranged between the upper spring seat and the lower spring seat; after going through the spring and the upper spring seat and the lower spring seat, two ends of the spring guiding pillar are connected to the upper frame beam and the lower frame beam respectively, forming a foundation framework. The spring together with the upper spring seat and the lower spring seat move along the spring guiding pillar, with both ends movable. A thread lead screw is arranged at the lower end of the spring guiding pillar, and the spring guiding pillar connecting nut is mounted on the thread lead screw of the spring guiding pillar, for the functions of gravity adjustment, limit, shock absorption and impact resistance. The gravity scale indicating device frame is fixed on the upper frame beam; one end of the lead screw is connected with the hand wheel; the other end of the lead screw passes through the framework connecting nut which is fixed on the gravity scale indicating device frame, and thus acting on the plane press plate by rotations. An upper end of the plane press plate guiding pillar is connected with the plane press plate; a lower end of the plane press plate guiding pillar passes though the upper frame beam and is connected to the upper spring seat, and the rotations of the lead screw act on the plane press plate and move the plane press plate guiding pillar and the upper spring seat accordingly to adjust the length of the spring. The upper pulley block passes though the upper spring seat and is mounted on the upper frame beam, the lower pulley block is mounted on the lower spring seat; one end of the steel wire rope connecting the pulley block and the vortex track is fixed to one side of the lower pulley block, then goes around the upper pulley block and the lower pulley block; the other end of the steel wire rope connecting the pulley block and the vortex track is connected with the vortex track, the vortex track is engaged with the big wheel synchronously or asynchronously; one end of the steel wire rope connecting the big wheel and the fitness equipment is fixed to the big wheel; after going around the big wheel, the other end of the steel wire rope connecting the big wheel and the fitness equipment is connected with the fitness equipment. When the user operates the fitness equipment, the big wheel and the vortex track are moved by the steel wire rope connecting the pulley block and the vortex track. The rotations of the vortex track change the stress radius of the steel wire rope connecting the pulley block and the vortex track, at the same time, the lower spring seat and the spring are pulled by the steel wire rope connecting the pulley block and the vortex track though the lower pulley block.

The springs can be compression coil springs, extension springs or volute spiral springs and so on, or can be made of other elastic materials. The type of the springs can be chosen according to different kinds of fitness equipment. At least one spring from a category, a combination of the springs of different strengths from different categories or the springs of different strengths from the same category.

The spring guiding pillar, the upper spring seat, the lower spring seat, the upper frame beam, and the lower frame beam are combined to form a foundation framework. Its function is to made the springs to move along the preset track. The design of the foundation framework can be changed according to the different needs of the design with other types of springs.

The adjustment way of the gravity of the fitness equipment spring counterweights balancer can be setting the spring strength by adjusting the deformation length of spring through the thread lead screw engaged with the nut. The gravity can also be preset by the way of decreasing or increasing the number of the springs. The lead screw, the gravity scale indicating device frame, the framework connecting nut, the plane press plate, the hand wheel, the spring guiding pillar are combined to form a preset adjustment device of the spring strength, which is a design approach to preset and adjust the spring strength. Upon the different design requirements or different types of springs, the combination forms can be different. The spring strength setting can be adjusted manually or with hydraulic tools or power tools and so on. The preset adjustment device of spring strength can directly preset the spring strength. Alternatively, it can be connected with the external display control system via cable or wirelessly. The installation location of the external display control system can be decided according to the different types of fitness equipment. When the gravity is adjusted by using decreasing or increasing the number of springs, the combination of the lead screw, the gravity scale indicating device frame, the framework connecting nut, the plane press plate, the hand wheel, and the spring guiding pillar. The gravity scale indicating device can indicate by an intuitive scale or an electronic display without a scale, such as a LED display, a LED digital tube, a diode and so on, with the equivalent effects.

The combination of the pulley block and the steel wire rope connecting the pulley block and the vortex track is a design approach to extend the stroke of the spring. The engagement between the sprocket wheels or chains and gears or racks. When the gravity is adjusted using the long stroke spring, or by decreasing or increasing the number of springs, it is unnecessary.

The combination of the vortex track, the steel wire rope connecting the pulley block and the vortex track, the big wheel works as an adjustment device of the spring strength. It is a design approach of generating a balance or a force within the set range to change the spring strength. A principle of leverage is used, i.e., in the process, a displacement of the resistance point or power point of the principle of leverage is generated so as to change the spring strength.

The vortex track is engaged with the big wheel synchronously or asynchronously, and connected with the fitness equipment through the steel wire rope. Whether using the big wheel or not is decided according to the different types of the fitness equipment.

The fundamental operating principle of the invention:

A preset gravity can be reached, by presetting the spring strength with a required strength by the spring adjusting device, or decreasing or increasing the number of springs. Taking the gravity strength as a standard of pulling the spring, the spring is pulled by people, also by means of the vortex track at the same time, the balance force or a force within the set range is formed.

The invention uses the springs as an energy storage tool to replace the counterweights of the traditional fitness equipment or other forms of counterweight. It is a new type of fitness equipment counterweights device. It applies to any fitness equipment in need of taking counterweights as load. Because of unique properties of the spring free from environmental constraints, the invention can be provided as fitness equipment for astronauts in space. It also can be used as a counterweights balancer in industrial or other fields.

Comparing to the traditional fitness equipment counterweight device and the spring counterweight balancer, the outstanding advantages of the invention are provided as follows:

1. As the spring counterweight device of the fitness equipment, the invention uses the springs as energy storage materials. As a result, the spring counterweight device of the fitness equipment is not affected by the direction and location of placement. Based on this, compared to the traditional fitness equipment, the designed fitness equipment has a smaller volume, a more compact shape, an overall lighter weight, and a low cost and transportation cost. The installation position of the new counterweight device on the different fitness equipment can be optimized for the convenience of the user's operation and switch of different gravities is easier. For professional gyms, with the same space and investments, more configurations of the fitness equipment are provided to meet the demand of more people exercising at the same time. For the ordinary families or working places, it is also more conducive for the promotion and popularization.

2. As the spring counterweight device of the fitness equipment, the invention uses the springs as energy storage materials. Because of unique properties of the spring free from environmental constraints, the invention can be provided as fitness equipment for astronauts in space.

3. As the spring counterweight device of the fitness equipment, referring to the indication of weight values, the gravity can be adjusted flexibly, so as to improve the adjustment accuracy. The gravity can also be adjusted by decreasing or increasing the number of springs.

4. As the spring counterweight device of the fitness equipment, the spring energy storage box of the invention is used hermetically. The gravity can be adjusted by the user manually or electrically outside of the box, without contacting with the inside of the storage box, and thus enhancing the safety.

5. As the spring counterweight device of the fitness equipment, the preset adjustment device of spring strength can directly preset the spring strength. Alternatively, the external display control system can be connected via cable or wirelessly. The installation location of the external display control system can be designed according to the different types of fitness device. The control system can add more features such as physical signs display of the user, and fitness process records. The control system can also be connected with mobile phones, computers and other electronic devices to form a health record and fitness planning.

6. As the spring counterweight device of the fitness equipment, the invention can provide a device suitable for switch of a variety of objects with different weights, and thus providing favorable conditions for the production, reducing equipment investments and labor load.

BRIEF DESCRIPTION OF THE DRAWINGS

FIG. 1 is the structural diagram of the embodiment of the invention.

DETAILED DESCRIPTION OF THE INVENTION

As shown in FIG. 1, the embodiment has hand wheel 1, lead screw 2, framework connecting nut 3, gravity scale indicating device frame 4 (a way of scale indication is used in this embodiment), plane press plate 5, plane press plate guiding pillar 6, upper frame beam 7, upper pulley block 81, lower pulley block 82, spring guiding pillar 9, upper spring seats 10, two springs 11, lower spring seat 12, spring guiding pillar connecting nut 13, lower frame beam 14, vortex track 15, big wheel 16, steel wire rope connecting the pulley block and the vortex track 17, steel wire rope connecting the big wheel and fitness equipment 18.

Hand wheel 1 is fixed at the top of lead screw 2. Two springs 11 are arranged between the upper spring seat 10 and the lower spring seat 12. After going through two springs 11 and upper spring seat 10 and lower spring seat 12, two ends of spring guiding pillar 9 are connected to upper frame beam 7 and lower frame beam 14 respectively, to form foundation framework. Two springs 11 together with upper spring seat 10 and lower spring seat 12 move along spring guiding pillar 9, with both ends movable. Thread lead screw 91 is arranged at the lower end of spring guiding pillar 9, and spring guiding pillar connecting nut 13 is mounted on thread lead screw 91 of spring guiding pillar 9, for the functions of gravity adjustment, limit, shock absorption and impact resistance. Gravity scale indicating device frame 4 is fixed on upper frame beam 7. One end of lead screw 2 is connected with hand wheel 1, and the other end of lead screw 2 passes through framework connecting nut 3 which is fixed on gravity scale indicating device frame 4, and thus acting on the plane press plate 5 by rotations. An upper end of plane press plate guiding pillar 6 is connected with plane press plate 5, and a lower end of plane press plate guiding pillar 6 passes though upper frame beam 7 and is connected to upper spring seat 10. The rotations of lead screw 2 act on plane press plate 5 and move plane press plate guiding pillar 6 and upper spring seat 10 accordingly to adjust the length of two spring 11. Upper pulley block 81 passes though upper spring seat 10 and is mounted on upper frame beam 7, and the lower pulley block 82 is mounted on lower spring seat 12. One end of steel wire rope 17 connecting pulley block and vortex track is fixed to one side of lower pulley block 82, then goes around upper pulley block 81 and lower pulley block 82. The other end of steel wire rope 17 connecting pulley block and vortex track is connected with vortex track 15, and vortex track 15 is engaged with big wheel 16 synchronously or asynchronously. One end of steel wire rope 18 connecting big wheel 16 and fitness equipment is fixed to big wheel 16. After going around big wheel 16, the other end of steel wire rope 18 connecting big wheel and the fitness equipment is connected with the fitness equipment. When the user operates the fitness equipment, big wheel 16 and vortex track 15 are moved by steel wire rope 18 connecting pulley block and vortex track. The rotations of vortex track 15 change the stress radius of steel wire rope 17 connecting pulley block and vortex track, at the same time, lower spring seat 12 and two springs 11 are pulled by steel wire rope 17 connecting pulley block and the vortex track though the lower pulley block 82.

The invention has a spring energy regulating box, at least one pulley block, the vortex track, the big wheel, and the steel wire rope. The spring energy storage regulating box has at least one spring. The both ends of the spring are arranged on the spring seats, moving along the spring guiding pillar, with both ends movable. A gravity calibration device is located at one end of the spring energy regulating box. The thread is arranged on the spring guiding pillar, engaging with the adjustment nut to calibrate the benchmark gravity. The gravity indicating device which is adjusted by the thread lead screw is located at the other end of the spring energy regulating box. The spring strength is set by the gravity indicating device. A group of pulley blocks is mounted on the frame beam, and the other group of pulley blocks which passes through the spring seat and is mounted on the other spring seat. One end of the steel wire rope is fixed on the pulley block and goes around the pulley blocks, and the other end of the steel wire rope is fixed on the vortex track, which is engaged with the big wheel synchronously or asynchronously. The steel wire rope is fixed on the big wheel. One end of the steel wire rope is fixed on the big wheel. After going around the big wheel, the other end of the steel wire rope is fixed on the fitness equipment. When operating the fitness equipment, the vortex track and the big wheel are pulled by the steel wire rope contacting the big wheel. The stress radius of the steel wire rope along the vortex track is changed by the function of the vortex track, so that the force reaches to balance or within the set range. The force can be any balance force or the force within the set range by adjusting the gravity scale indicating device.

Although the invention is showed and described with a preferable embodiment, the ordinary skilled in the art should understand, within the spirit and scope of the invention, without departing from the appended claims, the various changes to the invention in the forms and details fall within protection scope of the invention.

The invention claimed is:

1. A fitness equipment spring counterweights balancer, comprising: a hand wheel, a lead screw, a framework connecting nut, a gravity scale indicating device frame, a plane press plate, a plane press plate guiding pillar, an upper frame beam, an upper pulley block, a lower pulley block, a spring guiding pillar, an upper spring seat, a spring, a lower spring seat, a spring guiding pillar connecting nut, a lower frame beam, a vortex track, a big wheel, a steel wire rope connecting the pulley block and the vortex track, a steel wire rope connecting the big wheel and the fitness equipment; wherein the hand wheel is fixed at the top of the lead screw; the spring is arranged between the upper spring seat and the lower spring seat; after going through the spring and the upper spring seat and the lower spring seat, two ends of the spring guiding pillar are connected to the upper frame beam and the lower frame beam respectively, forming a foundation framework; the spring together with the upper spring seat and the lower spring seat move along the spring guiding pillar; a thread lead screw is arranged at the lower end of the spring guiding pillar; the spring guiding pillar connecting nut is mounted on the thread lead screw of the spring guiding pillar; the gravity scale indicating device frame is fixed on the upper frame beam; one end of the lead screw is connected with the hand wheel; the other end of the lead screw passes through the framework connecting nut which is fixed on the gravity scale indicating device frame; an upper end of the plane press plate guiding pillar is connected with the plane press plate; a lower end of the plane press plate guiding pillar passes though the upper frame beam and is connected to the upper spring seat; the upper pulley block passes though the upper spring seat and is mounted on the upper frame beam, the lower pulley block is mounted on the lower spring seat; one end of the steel wire rope connecting the pulley block and the vortex track is fixed to one side of the lower pulley block, then goes around the upper pulley block and the lower pulley block; the other end of the steel wire rope connecting the pulley block and the vortex track is connected with the vortex track, the vortex track is engaged with the big wheel synchronously or asynchronously; one end of the steel wire rope connecting the big wheel and the fitness equipment is fixed to the big wheel; after going around the big wheel, the other end of the steel wire rope connecting the big wheel and the fitness equipment is connected with the fitness equipment.

2. A fitness equipment spring counterweights balancer according to claim 1, wherein the spring is compression coil spring, extension spring or volute spiral spring.

* * * * *